(No Model.)
T. A. EDISON.
ELECTRICAL TRANSMISSION OF POWER.
No. 370,129. Patented Sept. 20, 1887.
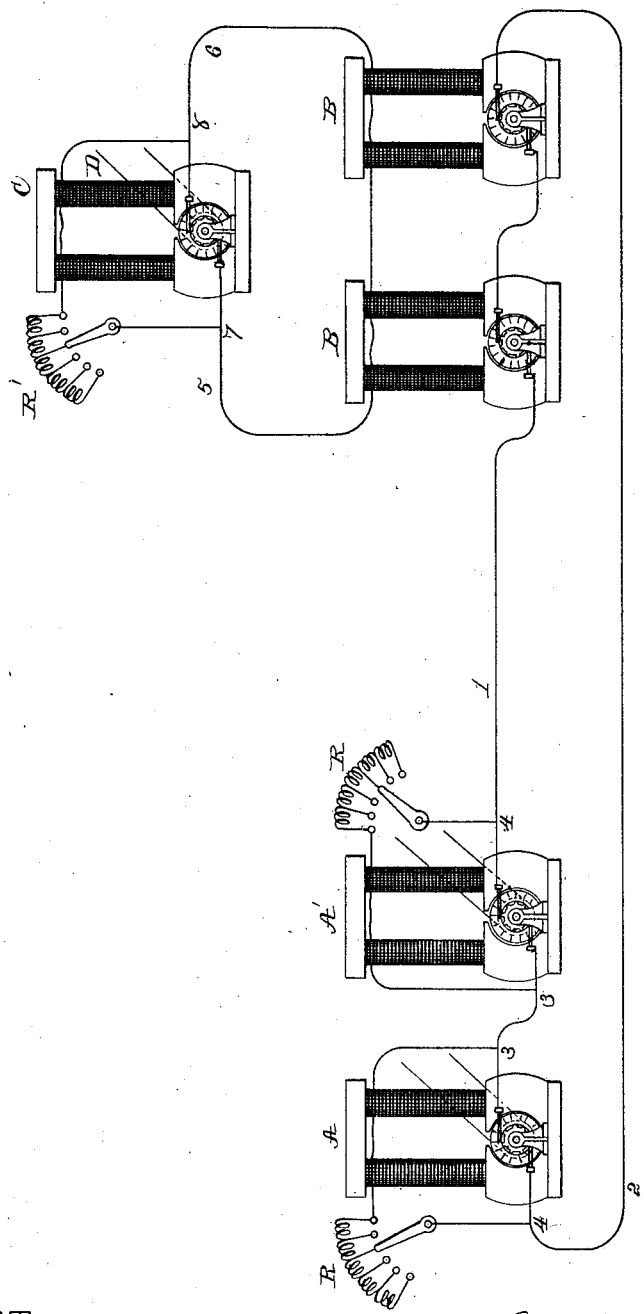
ATTEST:
E. C. Rowland
H. W. Seely
INVENTOR:
Thomas A. Edison,
By Rich'd N. Dyer,
Atty.

UNITED STATES PATENT OFFICE.

THOMAS A. EDISON, OF MENLO PARK, NEW JERSEY.

ELECTRICAL TRANSMISSION OF POWER.

SPECIFICATION forming part of Letters Patent No. 370,129, dated September 20, 1887.

Application filed June 7, 1883. Serial No. 97,329. (No model.)

*To all whom it may concern:*

Be it known that I, THOMAS A. EDISON, of Menlo Park, in the county of Middlesex and State of New Jersey, have invented a new and useful Improvement in Electrical Transmission of Power, (Case No. 571,) of which the following is a specification.

This invention relates to operating independent electro-motors (that is, motors separate from each other and not placed on the same shaft, as is the case with those shown in my Patent No. 248,435 (by means of dynamo or magneto electric machines placed at a distant point, and my object is to make the regulation of the speed and power of such motors independent of the current on the supplying-circuit; and the invention consists in the use, in connection with two or more independent electro-dynamic motors operated by dynamo or magneto electric machines placed at a distance, of one or more dynamo or magneto electric machines operated by a local source of power for energizing the fields of said motors. Such local source of power may be either mechanical or electrical. The latter arrangement, however, will be the subject of a separate application for Letters Patent. By thus separately energizing the field-magnets, instead of placing them in connection with the line, the regulation is performed without affecting the line-current, and the fields are not affected by variations on the line.

In carrying out my invention I prefer to employ, as a source of electrical energy, two or more dynamo-electric machines connected in series for generating high-tension currents; but one generator alone might be used, if desired. Each machine preferably has its field-coils in a shunt from the main circuit, such shunts being each provided with an adjustable resistance for regulating the generation of current by the machine. The armatures of the two or more independent electro-dynamic motors are also preferably connected in series, and means may, if desired, be provided for cutting individual motors out of circuit without affecting the others of the series. The fields of these motors are connected, in series or otherwise, in a circuit leading from one or more dynamo or magneto electric machines operated by a suitable local source of mechanical energy. Such exciting machine or machines may be regulated in any suitable manner, so that the speed of the motors is correspondingly regulated. Such regulation is preferably accomplished by an adjustable resistance in the field-circuit of the exciter or exciters. This arrangement of generators, motors, and exciter is illustrated diagrammatically in the accompanying drawings.

A A' are dynamo-electric machines, of which any desired number may of course be used. They are connected in series, and main conductors 1 2 extend from them. The field-coils of each generator are included in a shunt-circuit, 3 4, around its armature, and each of such shunts is provided with an adjustable resistance, R, for regulating the generation of current according to the requirements of the motors supplied.

B B represent any desired number of electro-dynamic motors placed in series in the main circuit 1 2.

C is a dynamo-electric machine, connected by a belt, D, with a local source of mechanical power. A circuit, 5 6, leads from the commutator-brushes of the generator C, and includes the field-magnet coils of both or all the electro-dynamic motors B B. A shunt-circuit, 7 8, includes the field-magnet coils of the generator C, and in said shunt is placed an adjustable resistance, R', for regulating the generation of current by the exciter, and in consequence the speed of the motors B; but the exciter may be regulated in any other suitable manner. By thus energizing the fields of the motors from a local source less current is required to traverse the circuit 1 2, and the motors may be regulated or controlled at or near the locality where they are placed.

The main current being supplied from a water-power at a distance, a small steam-engine can be employed to energize the fields.

What I claim is—

1. The combination, with dynamo or magneto electric machines and electro-dynamic motors connected therewith, of a local source of electricity for energizing the fields of said motors, substantially as set forth.

2. The combination, with dynamo or magneto electric machines and electro-dynamic motors connected therewith, of a mechanically-operated local source of electricity for energizing the fields of said motors, substantially as set forth.

3. The combination, with dynamo or magneto electric machines and electro-dynamic motors connected therewith, of a local source of electricity for energizing the fields of said motors and means for regulating the production of current by said source, substantially as set forth.

4. The combination, with one or more dynamo or magneto electric machines and two or more independent electro-dynamic motors arranged in series and connected therewith, of a local source of electricity for energizing the fields of said motors, substantially as set forth.

5. The combination of one or more dynamo or magneto electric machines, two or more independent electro-dynamic motors having their armatures connected therewith, and one or more dynamo or magneto electric machines for energizing the fields of said motors, substantially as set forth.

6. The combination, with two or more independent electro-dynamic motors, of one or more dynamo or magneto electric machines and a circuit therefrom, including the armatures of said motors arranged in series, and one or more other dynamo or magneto electric machines and a circuit therefrom, including, in series, the fields of said motors, substantially as set forth.

This specification signed and witnessed this 1st day of June, 1883.

THOS. A. EDISON.

Witnesses:
H. W. SEELY,
EDWARD H. PYATT.